US012431022B2

(12) United States Patent
Baek

(10) Patent No.: US 12,431,022 B2
(45) Date of Patent: *Sep. 30, 2025

(54) METHOD AND APPARATUS FOR ASSISTING RIGHT TURN OF VEHICLE BASED ON UWB COMMUNICATION AND V2X COMMUNICATION AT INTERSECTION

(71) Applicant: HYUNDAI MOBIS CO., LTD., Seoul (KR)

(72) Inventor: Song Nam Baek, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 153 days.

This patent is subject to a terminal disclaimer.

(21) Appl. No.: 18/376,967

(22) Filed: Oct. 5, 2023

(65) Prior Publication Data

US 2024/0203259 A1 Jun. 20, 2024

(30) Foreign Application Priority Data

Dec. 15, 2022 (KR) ........................ 10-2022-0176195

(51) Int. Cl.

*G08G 1/00* (2006.01)
*G08G 1/052* (2006.01)
*G08G 1/056* (2006.01)
*G08G 1/16* (2006.01)

(52) U.S. Cl.

CPC ............. *G08G 1/164* (2013.01); *G08G 1/052* (2013.01); *G08G 1/056* (2013.01); *G08G 1/166* (2013.01)

(58) Field of Classification Search

CPC ........ G08G 1/164; G08G 1/052; G08G 1/056; G08G 1/166; G08G 1/005; G08G 1/163; G08G 1/167; G08G 1/00; H04W 4/40; B60W 30/08; B60W 30/18154; B60W 30/18159; B60W 40/105; B60W 50/14; B60W 2050/009; B60W 2050/143; B60W 2520/10; B60W 2552/53;

(Continued)

(56) References Cited

U.S. PATENT DOCUMENTS

2021/0316750 A1* 10/2021 Jo ................... B60W 30/18154
2024/0203261 A1* 6/2024 Baek ...................... G08G 1/012

* cited by examiner

*Primary Examiner* — Shardul D Patel
(74) *Attorney, Agent, or Firm* — Morgan, Lewis & Bockius LLP

(57) ABSTRACT

A method and an apparatus for assisting right turn of a vehicle based on UWB communication and V2X communication at an intersection are disclosed.

The right-turn assisting apparatus comprises a communication unit including a first communication module configured to receive map information and signal information from a road side unit through a first communication protocol, and a second communication module configured to estimate positions of candidate terminals among terminals of pedestrians around the intersection through a second communication protocol. The right-turn assisting apparatus comprises a controller configured to determine a risk of collision between a terminal of interest among the candidate terminals and the vehicle based on the positions of the candidate terminals, the map information, and the signal information in response to determination of at least one of whether the vehicle is approaching the intersection or whether the vehicle has a turning intention, and to warn of the risk of collision with the terminal of interest.

22 Claims, 6 Drawing Sheets

(58) Field of Classification Search
CPC ... B60W 2554/4029; B60W 2554/802; B60W 2555/60; B60W 2556/45
USPC .......................................................... 701/301
See application file for complete search history.

METHOD AND APPARATUS FOR ASSISTING RIGHT TURN OF VEHICLE BASED ON UWB COMMUNICATION AND V2X COMMUNICATION AT INTERSECTION

CROSS REFERENCE TO RELATED APPLICATION

The present application is based on and claims the benefit of priority to Korean Patent Application Number 10-2022-0176195, filed on Dec. 15, 2022 in the Korean Intellectual Property Office, the entire disclosure of which is incorporated herein by reference.

TECHNICAL FIELD

The present disclosure relates to a method and an apparatus for assisting right turn of a vehicle based on UWB communication and V2X communication at an intersection.

BACKGROUND

The content described hereinbelow merely provides background information on the present disclosure and does not constitute the prior art.

Recently, for the purpose of protecting a pedestrian, traffic laws have been changed to prevent a collision with the pedestrian when a vehicle turns right at an intersection. For example, when a pedestrian is passing or is about to cross a crosswalk positioned on a vehicle's travel path, the vehicle must stop.

In order to prevent a pedestrian collision according to traffic laws, a driver of a vehicle may directly control the vehicle, but an Advanced Driver Assistance System (ADAS) of the vehicle may be used.

In order to implement Autonomous Emergency Braking (AEB) and Forward Collision Warning (FCW), which prevents a collision with a pedestrian, among the functions of the ADAS, the ADAS may detect a pedestrian using a sensor such as a camera, a high-resolution radar device, or a lidar device.

However, a sensor-based pedestrian detection is problematic in that it is difficult to accurately detect a pedestrian in a None Line of Sight (NLOS) environment, a bad weather environment, or a dark environment. In particular, it may be difficult for the ADAS to detect a pedestrian located on a side of a vehicle at an intersection or a pedestrian located outside the field of view (FoV) of a camera.

FIG. 1 is an illustrative diagram depicting a situation involving a vehicle and a pedestrian at an intersection.

Referring to FIG. 1, a vehicle 110 is turning right at an intersection, and a pedestrian 120 is about to cross a crosswalk.

The vehicle 110 detects an object using a camera provided in the vehicle 110, determines a risk of collision with a nearby object, and controls speed according to the risk of collision.

However, due to the limited field of view 130 of the camera, the vehicle 110 may not detect the pedestrian 120. Thus, a collision between the vehicle 110 and the pedestrian 120 may occur.

As another example, the ADAS may easily detect a pedestrian in a fine day, but may not detect a pedestrian in a dark environment or a bad weather condition such as snow or rain, or may detect a pedestrian only within a narrow field of view. In addition, even when sunlight is too strong, the ADAS may not detect pedestrians due to backlight.

Due to the limitations of these sensors, a lot of research is being conducted on a method of preventing a collision with a pedestrian through the wireless communication of a vehicle.

As a part of the research, vehicle-to-everything (V2X) communication technology is being developed. A V2X module may implement an object detection function by communicating with other V2X modules in a range of 500 m.

However, since the V2X module estimates a position based on a global navigation satellite system (GNSS), there is a problem in that positioning accuracy is low in an environment where a satellite signal is weakly received. Furthermore, since the V2X modules are applied only to some of vehicles and pedestrian terminals, vehicles and terminals having no V2X module may not detect an object or may not be detected as objects.

In order to solve the problems of the V2X module, Ultra-Wide Band (UWB) communication technology for the vehicle is being actively researched instead of V2X communication technology. The UWB communication method has a high-precision ranging positioning function of 20 cm to 50 cm, a radar function, and excellent security, compared to the V2X communication method. Furthermore, the penetration rate of the UWB communication module is increasing compared to that of the V2X communication module. The latest smartphones are equipped with UWB modules for various applications, and the vehicle is also equipped with UWB modules for smart key systems.

Therefore, there is a need for research into a method of preventing a pedestrian collision, particularly a method of efficiently and accurately detecting a pedestrian at an intersection, using the UWB communication technology with the high positioning accuracy and the high penetration rate as well as the V2X module.

SUMMARY

According to at least one embodiment, the present disclosure provides a right-turn assisting apparatus of a vehicle for preventing a collision with a pedestrian at an intersection. The right-turn assisting apparatus comprises a communication unit including a first communication module configured to receive map information and signal information from a road side unit through a first communication protocol, and a second communication module configured to estimate positions of candidate terminals among terminals of pedestrians around the intersection through a second communication protocol. The right-turn assisting apparatus further comprises a controller configured to determine a risk of collision between a terminal of interest among the candidate terminals and the vehicle based on the positions of the candidate terminals, the map information, and the signal information in response to determination of at least one of whether the vehicle is approaching the intersection or whether the vehicle has a turning intention, and to warn of the risk of collision with the terminal of interest.

According to another embodiment of the present disclosure provides a method of controlling a right-turn assisting apparatus of a vehicle for preventing a collision with a pedestrian at an intersection. The method comprises receiving map information and signal information from a road side unit through a first communication protocol using a first communication module. The method further comprises estimating positions of candidate terminals among terminals of pedestrians around the intersection through a second communication protocol using a second communication module.

The method further comprises determining a risk of collision between a terminal of interest among the candidate terminals and the vehicle based on the positions of the candidate terminals, the map information, and the signal information in response to determination of at least one of whether the vehicle is approaching an intersection or whether the vehicle has a turning intention. The method further comprises warning of the risk of collision with the terminal of interest

DETAILED DESCRIPTION

Figure 1:
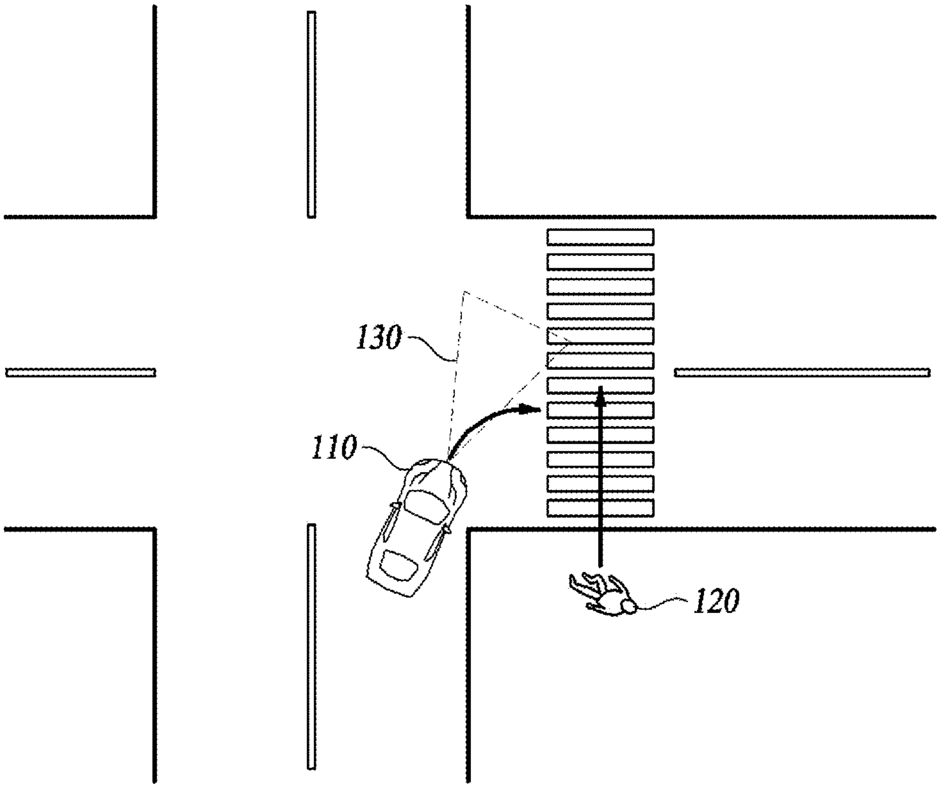
FIG. 1 (Prior Art)
FIG. 1 is an illustrative diagram depicting a situation involving a vehicle and a pedestrian at an intersection.

In view of the above, an embodiment provides an apparatus and method for assisting a right turn, which prevent a pedestrian collision based on a high definition map and signal information received through a V2X module in a system including the V2X module and a UWB module, and effectively prevent the collision with a pedestrian by detecting the pedestrian who is not detected by a sensor, and estimating the position of a pedestrian through UWB communication with a pedestrian's terminal when a vehicle turns right at an intersection.

An embodiment provides an apparatus and method for assisting a right turn, which use a bluetooth module operating at low energy and a UWB module enabling high-precision positioning together, thus allowing high-accuracy positioning to be performed at low energy.

The objectives to be achieved by the present disclosure are not limited to the above-mentioned objectives, and other objectives which are not mentioned will be clearly understood by those skilled in the art from the following description.

The problems to be solved by the present disclosure are not limited to the problems mentioned above, and other problems not mentioned will be clearly understood by those skilled in the art from the following description.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part "includes" or is "equipped with" an element, this means that the part may further include other elements, not excluding other elements unless explicitly stated to the contrary. Further, when an element in the written description and claims is described as being "for" performing or carry out a stated function, step, set of instructions, or the like, the element may also be considered as being "configured to" do so.

Each component of a device or method according to the present disclosure may be implemented in hardware or software, or in a combination of hardware and software. In addition, the functions of each component may be implemented in software. A microprocessor or processor may execute functions of the software corresponding to each component.

Figure 2:
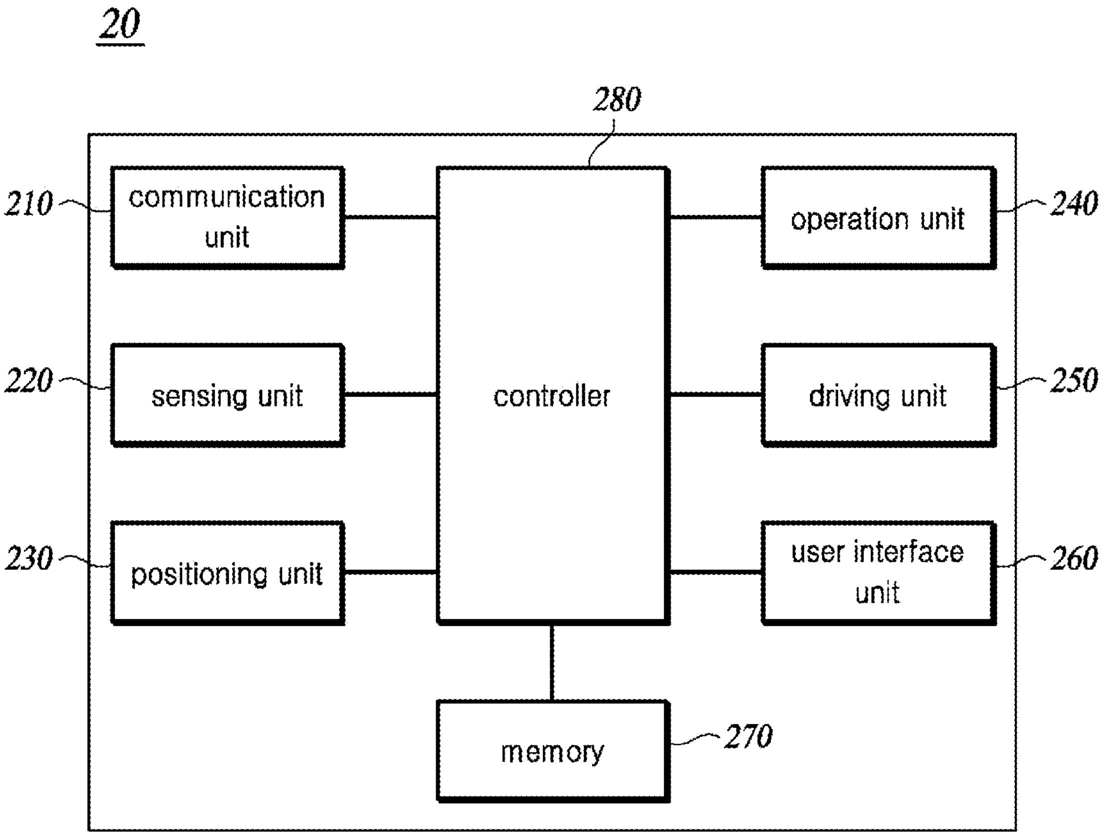
FIG. 2 is a diagram illustrating the configuration of a vehicle according to an embodiment of the present disclosure.

FIG. 2 is a diagram illustrating the configuration of a vehicle according to an embodiment of the present disclosure.

Referring to FIG. 2, a vehicle 20 includes at least one of a communication unit 210, a sensing unit 220, a positioning unit 230, an operation unit 240, a driving unit 250, a user interface unit 260, a memory 270, and a controller 280.

The communication unit 210 may exchange signals with devices positioned outside and inside the vehicle 20. The communication unit 210 may exchange a signal with at least one of an infrastructure device such as a server or a base station, another vehicle, and a terminal.

The communication unit 210 may include at least one of a transmission antenna, a reception antenna, a radio frequency (RF) circuit capable of implementing various communication protocols, and an RF element to perform communication.

The communication unit 210 may include an internal communication part and an external communication part.

The internal communication part may transmit or receive signals using various communication protocols present in the vehicle 20. In this regard, an internal communication protocol may include at least one of Controller Area Network (CAN), CAN with Flexible Data rate (CAN FD), ethernet, Local Interconnect Network (LIN), and FlexRay. The communication protocol may include other protocols for performing communication between various devices mounted on the vehicle.

The external communication part may perform communication with other vehicles, an infrastructure system, a base station, or a roadside device using various communication protocols. In this regard, the external communication protocol may include Vehicle-to-Everything (V2X) communication including Vehicle-to-Vehicle (V2V) communication, Vehicle-to-Infrastructure (V2I) communication, Vehicle-to-Network (V2N) communication, and Vehicle-to-Pedestrian (V2N) communication. The infrastructure may be, for example, a roadside unit or server that periodically transmits traffic information in conjunction with a Transportation Information System (TIS) or an Intelligent Transport System (ITS).

In addition, the external communication part may use various communication methods, such as vehicular ad hoc network (VANET), Wireless Access in Vehicular Environments (WAVE), Dedicated Short Range Communication (DSRC), Cellular-V2X (C-V2X) communication, Wireless LAN (WLAN) communication, Wireless-Fidelity (Wi-Fi) communication, Wireless Broadband (WiBro) communication, Long Term Evolution (LTE) communication, Long Term n Evolution-Advanced (LTE-A) communication, 5G communication, 6G communication, Ultra Wideband (UWB) communication, Bluetooth communication, ZigBee communication, and Near Field Communication (NFC) communication.

C-V2X technology may include LTE-based sidelink communication and/or NR-based sidelink communication.

WAVE communication and DSRC communication are standards made to exchange signals with external devices based on IEEE 802.11p PHY/MAC hierarchy technology and IEEE 1609 Network/Transport hierarchy standard. WAVE communication and DSRC communication may provide Intelligent Transport System (ITS) services through dedicated short-range communication between vehicle-mounted devices or between a roadside device and a vehicle-mounted device. WAVE communication and DSRC communication adopt SAE J2735 and SAE J2945 standards. In particular, SAE J2735 relates to message standards, and defines a V2X message such as Basic Safety Message (BSM), Cooperative Awareness Message (CAM), and Decentralized Environmental Notification Message (DENM). The V2X message may include identification information, position information, speed information, time information, curvature-radius information, path history information, predicted path information, event information, size information, lighting information, state information, or turn-signal information of the vehicle 20.

According to an embodiment of the present disclosure, the communication unit 210 support Ultra-Wide Band (UWB) communication. UWB communication adopts an impulse radio (IR) method as described in IEEE 802.15.4a standard and IEEE 802.15.4z, and uses a 2 ns pulse for measuring Time of Flight (ToF) and Angle of Arrival (AoA). The UWB communication adopts a safe precise ranging and sensing method as specified in IEEE 802.15.4z.

According to another embodiment of the present disclosure, the communication unit 210 includes a UWB module using a UWB communication protocol, a BLE module using a Bluetooth at Low Energy (BLE) communication protocol, and a V2X communication module using a V2X communication protocol.

The sensing unit 220 may sense the state of the vehicle 20 and an external object.

In order to sense the state of the vehicle 20, the sensing unit 220 may include at least one of an inertial measurement unit (IMU), a distance measuring instrument (DMI), a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, a ultrasonic sensor, an illuminance sensor, and a pedal position sensor. On the other hand, the IMU sensor may include one or more of an acceleration sensor, a gyro sensor, and a magnetic sensor. The sensing unit 220 may generate state data of the vehicle, based on a signal generated from at least one sensor. For example, direction information such as the heading and yaw rate of the vehicle 20 may be collected by the sensing unit 220.

In order to sense the external object, the sensing unit 220 may include at least one of a camera, a radar sensor, a Light Detection and Ranging (LiDAR) sensor, an ultrasonic sensor, and an infrared sensor. The sensing unit 220 may measure at least one of information about the presence or absence of an object, information about a position of an object, information about a distance between the vehicle 20 and an object, information about relative speed between the vehicle 20 and an object.

The positioning unit 230 may generate position data of the vehicle 20.

The positioning unit 230 may include at least one of a Global Positioning System (GPS), a Differential Global Positioning System (DGPS), or a Global Navigation Satellite System (GNSS). The positioning unit 230 may generate the position data of the vehicle 20 based on a signal generated from at least one of the GPS, the DGPS or the GNSS.

The positioning unit 230 may estimate the position of the vehicle 20 based on wireless signals received from the communication unit 210.

The positioning unit 230 may estimate the current position of the vehicle 20 based on the previous position, travel distance information, moving time information, speed information, or acceleration information of the vehicle 20 using the IMU or DMI.

According to an embodiment of the present disclosure, the positioning unit 230 may estimate the position of the vehicle 20 based on UWB signals received at the communication unit 210.

Meanwhile, the controller 280 may estimate the path history and path prediction of the vehicle 20 based on the position information of the vehicle 20 collected by the positioning unit 230.

The operation unit 240 receives a user input for driving. In a manual mode, the vehicle 20 may be driven based on a signal provided by the operation unit 240. The operation unit 240 may include a steering input device such as a steering wheel, an acceleration input device such as an accelerator pedal, and a brake input device such as a brake pedal.

The driving unit 250 is a device that electrically controls various vehicle driving devices in the vehicle 20. The driving unit 250 may include a power train driving control device, a chassis driving control device, a door/window driving control device, a safety device driving control device, a lamp driving control device, and an air conditioning driving control device.

The driving unit 250 controls the movement of the vehicle 20 based on the input signal of the manipulation unit 240 or the control signal of the controller 280.

The user interface unit 260 is a device for communication between the vehicle 20 and a user. The user interface unit 260 may receive a user input and provide information generated in the vehicle 20 to the user. The vehicle 20 may implement a user interface (UI) or user experience (UX) through the user interface unit 260.

The user interface unit 260 may include an input device such as a keyboard or a mouse, and may include an output device such as a display device or a printer.

According to an embodiment of the present disclosure, the user interface unit 260 may output a collision risk warning in the form of audio, video, or vibration by the controller 280.

The memory 270 may store a program that causes a processor 720 to perform a method according to an embodiment of the present disclosure. For example, the program may include a plurality of commands executable by the processor, and the method according to an embodiment of the present disclosure may be performed by executing the plurality of commands by the processor.

The memory 270 may be a single memory or a plurality of memories. When the memory 270 is formed of the plurality of memories, the plurality of memories may be physically separated.

The memory 270 may include at least one of a volatile memory and a non-volatile memory. The volatile memory includes a Static Random Access Memory (SRAM) or a Dynamic Random Access Memory (DRAM), while the non-volatile memory includes a flash memory.

The memory 270 stores map information. The map information may be any one of a navigation map, an ADAS map, or a High Definition map (HD map). The ADAS map or the HD map may be received from an external device.

The navigation map includes a node indicating a point where at least two roads meet, and a link connecting the two nodes. The navigation map may include geographic information, road information, lane information, building information, or signal information.

The ADAS map incorporates more specific data compared to the navigation map. The ADAS map may include road gradient, road curvature, or sign information, based on a road.

The HD map incorporates more specific data compared to the ADAS map. The HD map may include lane information, lane boundary information, stop line position, traffic light position, signal sequence, or intersection information, based on a lane. The HD map may include basic road information, surrounding environment information, detailed road environment information, or dynamic road condition information. The detailed road environment information may include static information such as elevation of terrain, curvature, lane, lane centerline, regulation line, road boundary, road centerline, traffic sign, road sign, shape and height of the road, lane width, and the like. The dynamic road condition information may include traffic congestion, an accident section, a construction section, and the like. The HD map may include road surrounding environment information implemented in 3D, geometric information such as road shape or facility structure, and semantic information such as traffic signs or lane marks.

The memory 270 may further store identification (ID) information of each intersection.

The controller 280 may include at least one core capable of executing at least one command. The controller 280 may execute the commands stored in the memory 270. The controller 280 may be a single processor or a plurality of processors.

According to an embodiment of the present disclosure, the controller 280 may determine whether the vehicle 20 is approaching the intersection, detect the turning intention of the vehicle 20, estimate the positions of terminals of pedestrians, determine the risk of collision between the vehicle 20 and the pedestrian, and warn of the risk of collision. In this regard, the pedestrian may be referred to as a Vulnerable Road User (VRU).

Figure 3:
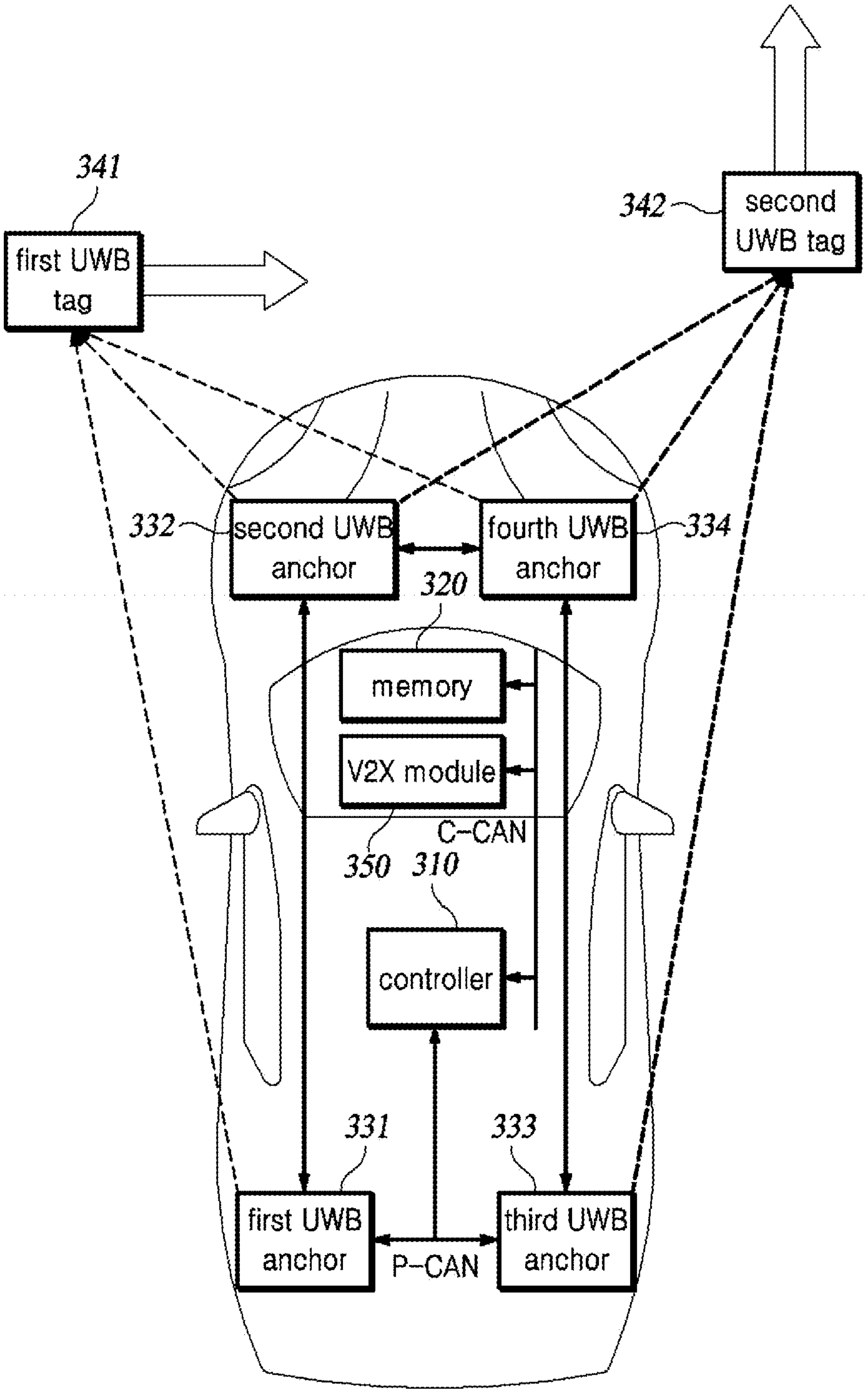
FIG. 3 is a diagram illustrating the configuration of a right-turn assisting system according to an embodiment of the present disclosure.

FIG. 3 is a diagram illustrating the configuration of a right-turn assisting system according to an embodiment of the present disclosure.

According to an embodiment of the present disclosure, the right-turn assisting system includes a terminal, a vehicle, and a road side unit. The terminal and the vehicle include UWB modules, while the vehicle and the road side unit include V2X modules. The right-turn assisting system uses both the V2X modules and the UWB modules to perform a right-turn assistance algorithm.

Referring to FIG. 3, the vehicle includes a controller 310, a memory 320, a plurality of UWB anchors 331, 332, 333, and 334, and a V2X module 350. The controller 310 of the vehicle determines the risk of collision between the vehicle and a pedestrian based on the map information and the signal information received through the V2X module 350, and the position information of the UWB tags 341 and 342 estimated through the plurality of UWB anchors 331, 332, 333 and 334, and warns of the risk of collision.

Although the vehicle includes four UWB anchors, at least two UWB anchors may be included so as to estimate the position of the UWB tag in another embodiment. On the other hand, the vehicle may further include a Bluetooth communication module to designate a candidate terminal among the terminals of the pedestrians around the intersection.

It is assumed that each pedestrian possesses the terminal. The terminal of each pedestrian includes the UWB tag. The first UWB tag 341 and the second UWB tag 342 may be handled in the same manner as the terminals of the pedestrians.

When the turning intention of the vehicle is detected according to at least one of lane information of the vehicle or the signal information, the controller 310 may activate the plurality of UWB anchors 331, 332, 333, and 334.

When the first UWB tag 341 and the second UWB tag 342 are within the vehicle's UWB communication range, the plurality of UWB anchors 331, 332, 333, and 334 establish the session connection with each of the first UWB tag 341 and the second UWB tag 342. For instance, the first UWB tag 341 periodically broadcasts a blink signal. When the second UWB anchor 332 receives the blink signal, the second UWB anchor 332 transmits a response signal to the first UWB tag 341. Through this process, the session connection is established between the first UWB tag 341 and the second UWB anchor 332. Moreover, each of the first UWB tag 341 and the second UWB tag 342 may be paired with the plurality of UWB anchors 331, 332, 333, and 334.

Hereinafter, a positioning operation based on Two-Way Ranging (TWR) will be described.

The plurality of UWB anchors 331, 332, 333, and 334 exchange UWB signals with the first UWB tag 341 and the second UWB tag 342. The controller 310 estimates the positions of the first UWB tag 341 and the second UWB tag 342 based on the UWB signals received through the plurality of UWB anchors 331, 332, 333, and 334.

Specifically, the first UWB tag 341 transmits a polling message to the second UWB anchor 332. The first UWB tag 341 records a transmission time t1 of the polling message.

The second UWB anchor 332 transmits a response message to the polling message. The second UWB anchor 332 records a reception time t2 of the polling message and a transmission time t3 of the response message.

The first UWB tag 341 records a reception time t4 of the response message. The first UWB tag 341 transmits a round-trip time message including a time difference between the transmission time t1 of the polling message and the reception time t4 of the response message to the second UWB anchor 332, and records the transmission time t5 of the round-trip time message.

The second UWB anchor 332 records the reception time t6 of the round-trip time message, and calculates a time difference between the transmission time t3 of the response message and the reception time t6 of the round-trip time message.

The second UWB anchor 332 calculates ToF through Equation 1.

$$ToF = \frac{[\{(t_4 - t_1) - (t_3 - t_2)\} + \{(t_6 - t_3) - (t_5 - t_4)\}]}{4} \quad \text{[Equation 1]}$$

The second UWB anchor 332 calculates a distance to the first UWB tag 341 by dividing the ToF by the propagation speed of light.

Through the above process, distances between the first UWB tag 341 and the plurality of UWB anchors 331, 332, 333, and 334 are calculated.

The position of the first UWB tag 341 is estimated by applying triangulation, trilateration, multilateration, etc. to the calculated distances or by applying the angle of arrival derived from the calculated distances.

The controller 310 may express the positions of the first UWB tag 341 and the second UWB tag 342 on a coordinate system having the position of the vehicle as an origin.

According to an embodiment of the present disclosure, since the vehicle including the plurality of UWB anchors 331, 332, 333, and 334 performs positioning by measuring a distance using time when it takes for the UWB signal to travel between two points, such as the ToF of the signal, Time Difference of Arrival (TDoA), or AoA, more accurate positioning is possible than a signal intensity-based positioning method. Specifically, a Wi-Fi-based positioning or Bluetooth-based positioning method estimates the position of the terminal based on the intensity of radio waves. However, since the signal intensity is distorted by an obstacle or a reflector, the positioning method based on the signal intensity has low positioning accuracy. However, since the ToF-based positioning method performs positioning based on the travel time of the signal that is not affected by external environment, positioning accuracy is high. Moreover, since the UWB communication has a wide frequency range, a pulse signal with a short time width may be used. This makes it possible to measure a distance in centimeters.

Moreover, the vehicle may estimate the directions of the UWB tags 341 and 342 using communication between the plurality of UWB anchors 331, 332, 333, and 334 and the UWB tags 341 and 342.

On the other hand, the V2X module 350 receives the V2X message through the V2X communication with a road side unit (RSU). Here, the V2X message includes the map information and the signal information.

Specifically, the road side unit is a V2X service device that may transmit and receive data to and from the vehicle using V2I service. Further, the road side unit is a fixed infrastructure entity that supports a V2X application program, and may exchange a message with another entity that supports the V2X application program. When the road side unit supports sidelink communication technology (e.g. ProSe communication technology, D2D communication technology), communication between the vehicle and the road side unit may be based on a sidelink channel.

The road side unit includes a memory that stores a routing table (including position information and timestamp information of nearby vehicles) and a map, one or more sensors installed around the road to detect the situation around the road, and an electronic controller (ECU) that controls these sensors. The road side unit may be implemented as a traffic light, a street lamp, or a signal controller positioned at a roadside.

The road side unit periodically transmits the V2X message including the signal information. The road side unit may transmit the V2X message in a broadcasting method.

Through the V2X communication with the road side unit, the V2X module 350 of the vehicle may acquire the map information and the signal information. Additionally, the V2X module 350 may further acquire the driving information and accident information of other vehicles from the V2X message.

The map information includes the HD map. The HD map may include lane information, lane boundary information, stop line position, traffic light position, or intersection information, based on a lane. Here, the lane information includes a right turn lane, a straight lane, a left turn lane, or a U-turn lane. The HD map may include a stop line and a crosswalk area of a lane where the vehicle is positioned, and may further include a stop line and a crosswalk area of a lane where the vehicle is to enter through the right turn.

On the other hand, the signal information represents signal phase and timing information, and includes intersection signal information about a vehicle and crosswalk signal information about a pedestrian. The intersection signal information about the vehicle includes the type of vehicle signal at the intersection, the remaining time of the vehicle signal at the intersection, or the next type of vehicle signal at the intersection. The type of the vehicle signal includes a straight signal, a stop signal, a left turn signal, a preliminary signal, a right turn signal, etc. The crosswalk signal information includes forward crosswalk signal information and right crosswalk signal information. The crosswalk signal information includes the type of signal for the forward crosswalk and the right crosswalk, the remaining time of the signal, or the type of the next signal. The type of the crosswalk signal includes a pedestrian signal and a stop signal.

Figure 4:
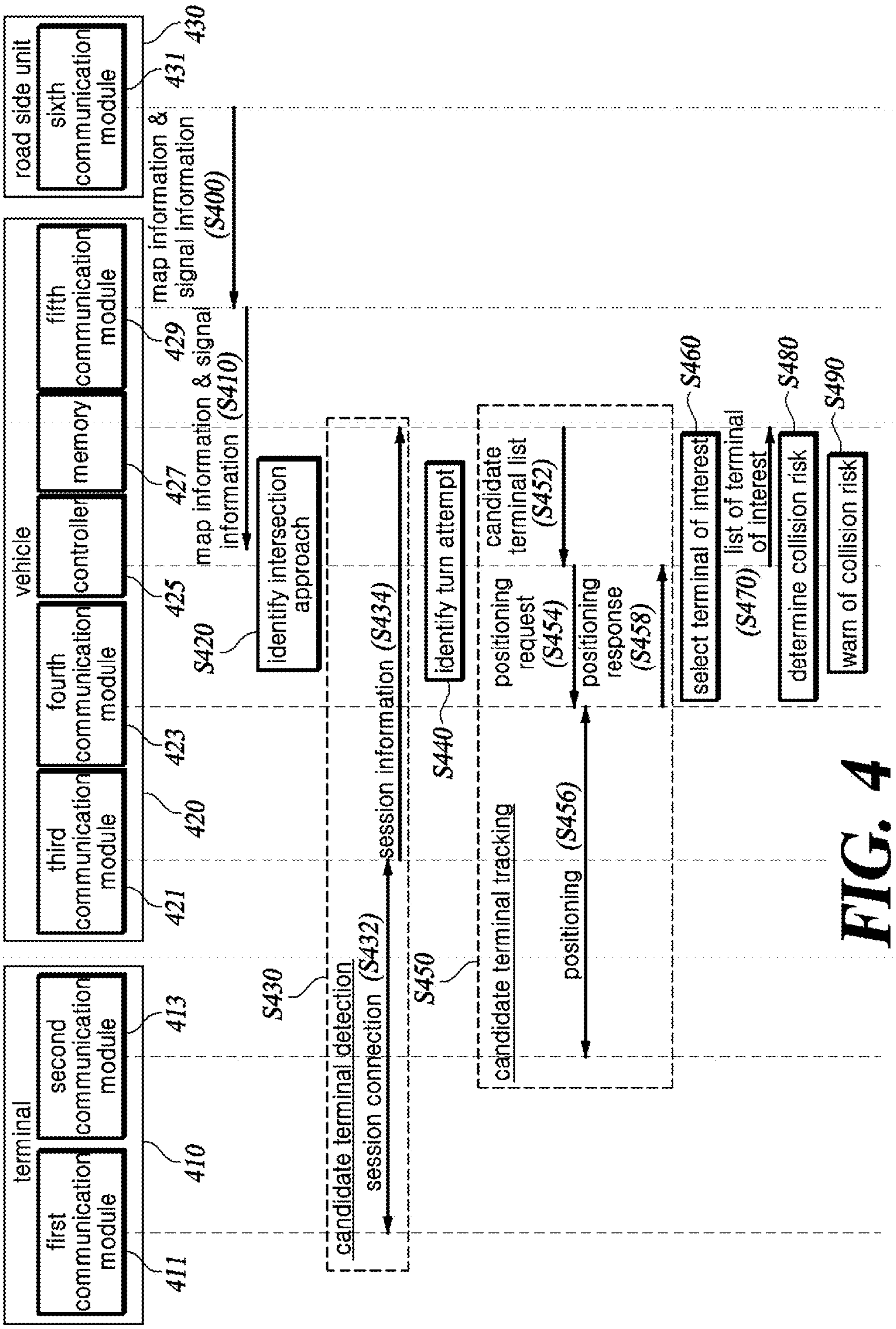
FIG. 4 is a flowchart of a right-turn assisting method according to an embodiment of the present disclosure.

FIG. 4 is a flowchart of a right-turn assisting method according to an embodiment of the present disclosure.

Referring to FIG. 4, a right-turn assisting system includes a terminal 410, a vehicle 420, and a road side unit 430. The pedestrian terminal 410 includes a second communication module 413, and may further include a first communication module 411. The vehicle 420 includes a fourth communication module 423, a controller 425, a memory 427, and a fifth communication module 429, and may further include a third communication module 421. The third communication module 421, the fourth communication module 423, the controller 425, the memory 427, and the fifth communication module 429 of the vehicle 420 constitute a right-turn assisting apparatus.

Here, the first communication module 411 and the third communication module 421 support a first communication protocol. The second communication module 413 and the fourth communication module 423 support a second communication protocol. The fifth communication module 429 and the sixth communication module 431 support a third communication protocol. Here, the first communication protocol, the second communication protocol, and the third communication protocol may be a Bluetooth at low energy (BLE) communication protocol, a UWB communication protocol, and a V2X communication protocol, respectively. The BLE communication protocol has lower power and a wider communication range than the UWB communication protocol, whereas the UWB communication protocol has higher positioning accuracy than the BLE communication protocol. The vehicle 420 accurately estimates the position of the terminal 410 based on the second communication protocol so as to prevent a collision with the terminal 410, and acquires map information and signal information based on the third communication protocol. Furthermore, the vehicle 420 may use the first communication protocol for power management.

First, the fifth communication module 429 of the vehicle 420 receives map information and signal information from the sixth communication module 431 of the road side unit 430 disposed around the intersection (S400).

The sixth communication module 431 generates the V2X message including the map information of the intersection and the signal information and periodically broadcasts the V2X message. The fifth communication module 429 receives the V2X message while the vehicle 420 is driving.

The fifth communication module 429 transmits the map information and the signal information to the controller 425 (S410).

The controller 425 receives the V2X message including the map information and the signal information, and extracts the map information and the signal information from the V2X message.

The controller 425 identifies the intersection approach of the vehicle 420 (S420).

Specifically, the controller 425 obtains the position of the stop line of the forward intersection from the HD map included in the map information. The controller 425 determines an approach distance from the position of the vehicle 420 to the stop line of the lane at which the vehicle 420 is positioned. The controller 425 determines the travel distance of the vehicle using an inertial measurement unit (IMU) and a distance measurement instrument (DMI), and determines whether the vehicle is approaching the intersection by comparing the approach distance and the travel distance. When the distance to the stop line is shorter than a preset first threshold distance, it is determined that the vehicle 420 approaches the intersection. For example, when the distance to the stop line is less than 50 m, the controller 425 may determine that the vehicle 420 approaches the intersection.

According to another embodiment of the present disclosure, the controller 425 determines that the vehicle 420 is approaching to the intersection, when the approach distance from the vehicle 420 to the stop line is shorter than the preset first threshold distance and the speed of the vehicle 420 is lower than a predetermined first threshold speed.

According to another embodiment of the present disclosure, as the distance between the position of the vehicle 420 and the position of the stop line is decreased over time, the controller 425 may determine that the vehicle 420 is approaching to the intersection.

According to another embodiment of the present disclosure, when receiving a message including an intention to cross the intersection or an intention to cross a crosswalk from the terminal 410, the controller 425 may determine that the vehicle 420 is approaching to the intersection.

In response to determining that the vehicle 420 is approaching to the intersection, the third communication module 421 may be activated. Subsequently, the third communication module 421 is deactivated when it is out of a predetermined radius from the position of the intersection.

The vehicle 420 may detect a candidate terminal among terminals of pedestrians around the intersection using the third communication module 421 (S430).

Specifically, the third communication module 421 of the vehicle 420 establishes a session connection with the first communication module 411 of the terminal 410 (S432). The terminal 410 that is session connected to the vehicle 420 becomes the candidate terminal. That is, the vehicle 420 detects, as the candidate terminal, the terminal connected to the third communication module 421 through the first communication protocol. When the session connection is established, the third communication module 421 transmits session information to the memory 427 (S434). Here, the session information includes the ID of the session, a signal intensity, etc.

Information on candidate terminals may be managed in the form of a table. The memory 427 may record session IDs and signal intensities for the candidate terminals in the table, and may periodically update the table. If the signal intensity is not updated for a predetermined time interval or update interval, the corresponding session ID may be deleted from the table.

As will be described later, the fourth communication module 423 of the vehicle 420 may perform positioning only on candidate terminals among surrounding terminals. The vehicle 420 may reduce the number of terminals performing positioning in the tracking of the candidate terminal (S450) through the detection of the candidate terminal (S430).

However, the detection of the candidate terminal (S430) may be omitted if necessary.

Thereafter, the controller 425 identifies a turn attempt of the vehicle 420 (S440).

The controller 425 determines an intention of the vehicle 420 to turn left or right. Specifically, the controller 425 determines whether the vehicle has a turning intention, based on at least one of the turn signal, the navigation path, the lane information, or the signal information of the vehicle 420. For example, the controller 425 determines that the vehicle 420 attempts to turn right when the right-turn signal of the vehicle is turned on. As another example, the controller 425 determines that the vehicle 420 attempts to turn right when the navigation path includes a right-turn path at the intersection. As another example, the controller 425 determines that the vehicle 420 attempts to turn right when the current lane of the vehicle 420 is the right-turn lane. When the current intersection signal according to the driving direction of the vehicle 420 indicates a right-turn signal, the controller 425 determines that the vehicle 420 attempts to turn right.

In order to determine the turning intention of the vehicle 420, the controller 425 may further use the speed of the vehicle 420. For example, when the right-turn signal of the vehicle 420 is turned on and the speed of the vehicle 420 is lower than a preset first threshold speed, the controller 425 may determine that the vehicle 420 attempts to turn right. As another example, when the current lane is a right-turn lane and the speed of the vehicle 420 is lower than a preset first threshold speed, the controller 425 may determine that the vehicle 420 attempts to turn right.

In response to determining that the vehicle has the turning intention, the fourth communication module 423 is activated.

The vehicle 420 tracks the positions of the candidate terminals using the fourth communication module 423 (S450).

Specifically, the controller 425 receives a candidate terminal list from the memory 427 (S452). The candidate terminal list relates to terminals that are session connected according to a first communication protocol.

The controller 425 transmits a positioning request to the fourth communication module 423 (S454). The controller 425 may request positioning only for terminals having session IDs recorded in the candidate terminal list.

The fourth communication module 423 performs positioning through communication with the second communication module 413 (S456). When the fourth communication module 423 of the vehicle 420 is the UWB anchor and the second communication module 413 of the terminal 410 is the UWB tag, the fourth communication module 423 of the vehicle 420 may estimate the position of the terminal 410 using the positioning method described in FIG. 3.

According to an embodiment of the present disclosure, the fourth communication module 423 may perform positioning starting from candidate terminals having high signal intensity according to the first communication protocol. That is, the fourth communication module 423 may estimate the positions of the candidate terminals based on priority according to the BLE received signal intensity. When the signal intensity of the first communication module 411 of the terminal 410 is higher than those of surrounding terminals, the fourth communication module 423 of the vehicle 420 preferentially estimates the position of the terminal 410 over other terminals. Since a high signal intensity means a position close to the vehicle 420, the vehicle 420 may preferentially position a terminal having a high collision risk.

The controller 425 receives a positioning response including the position of the terminal 410 from the fourth communication module 423 (S458).

The controller 425 may track the candidate terminals by obtaining the positions of the candidate terminals according to the positioning response and continuously updating the positions of the candidate terminals. Furthermore, the controller 425 may generate the path history and the path prediction of each of the candidate terminals using the positions of the candidate terminals, or may receive the path history and the path prediction from each of the candidate terminals.

The controller 425 selects a terminal of interest from candidate terminals to be tracked (S460).

Specifically, the controller 425 classifies the movement types of candidate terminals according to the position and direction relative to the vehicle 420, and selects a candidate terminal having a preset target movement type among the candidate terminals as a terminal of interest. Here, the direction of the candidate terminal indicates any one of a geomagnetic direction, a movement direction, a path history direction, or a predicted path direction.

Alternatively, the controller 425 may select the candidate terminal approaching to the vehicle 420 as the terminal of interest based on the respective positions and directions of candidate terminals. Alternatively, the controller 425 may select a terminal of interest according to distances of candidate terminals to the crosswalk area.

Figure 5:
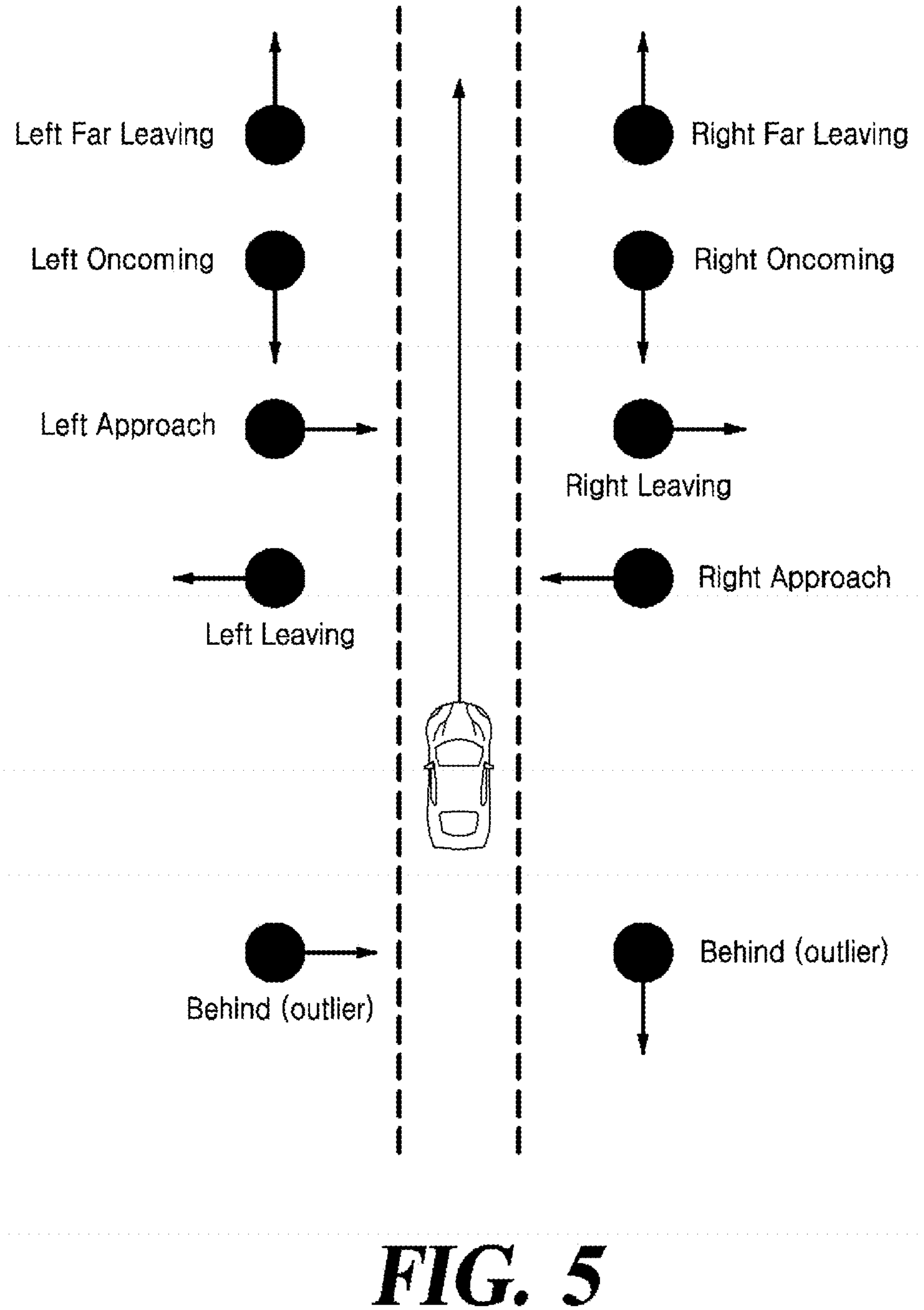
FIG. 5 is a diagram illustrating the result of classifying movement directions based on the positions of terminals, according to an embodiment of the present disclosure.

FIG. 5 is a diagram illustrating the result of classifying movement directions based on the positions of terminals, according to an embodiment of the present disclosure.

Referring to FIG. 5, the terminals are classified according to a total of 9 classes. Specifically, the terminals are classified according to the positions of the terminals relative to the lane of the vehicle and the directions of the terminals relative to the travel direction of the vehicle.

As classification classes, there are a first movement type (Left Leaving) having a direction leaving from the direction of the vehicle at the left position of the vehicle, a second movement type (Left Approach) having a direction approaching to the direction of the vehicle at the left position, a third movement type (Left Oncoming) having a direction opposite to that of the vehicle at the left position, a fourth movement type (Left Far Leaving) having the same direction as that of the vehicle at the left position, a fifth movement type (Right Approach) having a direction approaching to the direction of the vehicle at the right position of the vehicle, a sixth movement type (Right Leaving) having a direction leaving from the direction of the vehicle at the right position, a seventh movement type (Right Oncoming) having a direction opposite to the direction of the vehicle at the right position, an eighth movement type (Right Far Leaving) having the same direction as the direction of the vehicle at the right position, and a movement type (Behind) having a rear position of the vehicle.

All terminals positioned behind the vehicle and corresponding to a ninth movement type are classified as outliers.

The terminals of interest are terminals having any one of the second movement type, the third movement type, the fifth movement type, the seventh movement type, and the eighth movement type. The second movement type, the third movement type, the fifth movement type, the seventh movement type, and the eighth movement type may be previously defined as a preset target movement type.

Referring back to FIG. 4, the controller 425 may select the terminal 410 as the terminal of interest according to the movement type of the terminal 410.

Alternatively, the controller 425 may identify crosswalk areas from the HD map, and may select, as the terminal of interest, a candidate terminal positioned within a preset distance from the crosswalk areas or a candidate terminal approaching to the crosswalk area among the candidate terminals. Here, the crosswalk areas include a crosswalk area positioned in front of the vehicle 420, and a crosswalk area encountered when the vehicle 440 turns right.

The controller 425 stores the list of terminals of interest in the memory 427 (S470).

Thereafter, in the tracking of the candidate terminals (S450), power consumption may be reduced by tracking only terminals recorded in the list of terminals of interest stored in the memory 427.

Subsequently, the controller 425 determines the risk of collision with the pedestrian carried by the terminal 410 selected as the terminal of interest (S480).

First, the controller 425 identifies the crosswalk areas of the intersection from the HD map, and determines at least one of the crosswalk areas based on the position and direction of the terminal 410 as an expected movement area. For example, a crosswalk area positioned in the direction of the terminal 410 may be determined as an expected movement area among crosswalk areas close to the terminal 410.

Otherwise, the controller 425 may identify a crosswalk area closest to the terminal 410 or a crosswalk area within a preset second threshold distance from the terminal 410 among the crosswalk areas of the intersection as the expected movement area. Otherwise, the controller 425 may identify the crosswalk area which the terminal 410 is approaching as the expected movement area.

Subsequently, the controller 425 determines whether the expected movement area is a dangerous area.

The controller 425 determines that the expected movement area is the dangerous area based on the crosswalk signal for the expected movement area. Particularly, when a crosswalk signal is a pedestrian signal for the crosswalk area determined in the terminal 410 as the expected movement area, the controller 425 determines the crosswalk area as the dangerous area.

Otherwise, based on whether a part of the expected movement area is within a predetermined radius from the vehicle 420, the controller 425 determines the expected movement area as the dangerous area. For example, when a circle having the position of the vehicle 420 as a center and having a preset radius overlaps the expected movement area, the controller 425 may determine that the expected movement area is a dangerous area. In other words, when the distance between the expected movement area and the vehicle is shorter than the preset second threshold distance, the controller 425 determines the expected movement area as the dangerous area.

Subsequently, the controller 425 determines the risk of collision between the terminal 410 and the vehicle 420 within the dangerous area.

According to an embodiment of the present disclosure, when the terminal 410 approaches the dangerous area, the controller 425 determines that there is a risk of collision.

According to an embodiment of the present disclosure, the controller 425 determines the risk of collision based on whether the terminal of interest has entered the dangerous area and the speed of the vehicle. For example, when the terminal 410 approaches the dangerous area and the speed of the vehicle 420 is higher than the preset second threshold speed, the controller 425 determines that there is a risk of collision. The second threshold speed may be km/h, which is lower than the first threshold speed of 30 km/h.

According to another embodiment of the present disclosure, when the direction of the terminal 410 intersects the predicted path of the vehicle 420, the controller 425 determines that there is a risk of collision.

According to another embodiment of the present disclosure, the controller 425 determines the risk of collision based on whether the direction of the terminal of interest and the predicted path of the vehicle intersect within the dangerous area and the speed of the vehicle. For example, when an intersection between the direction of the terminal 410 and the predicted path of the vehicle 420 exists within the dangerous area and the speed of the vehicle 420 is higher than the second threshold speed, the controller 425 determines that there is a risk of collision.

When it is determined that there is a risk of collision, the controller 425 warns a user of the risk of collision with a pedestrian (S490).

The controller 425 may notify the user of the collision risk in a manner such as audio, image, or vibration using a user interface. Moreover, the controller 425 may notify the terminal 410 of a collision risk through a collision risk message. Conversely, when there is no risk of collision or the risk disappears, the controller 425 may inform the user or the terminal 410 that there is no risk of collision.

Subsequently, the controller 425 determines that the risk of collision with the vehicle 420 disappears. By way of example, when the vehicle 420 is farther than a predetermined third threshold distance from the crosswalk area, the controller 425 may determine that the risk of collision with the vehicle 420 has disappeared. As another example, when candidate terminals or terminals of interest are located behind the vehicle 420, the controller 425 may determine that the risk of collision with the vehicle 420 has disappeared.

When the risk of collision with the vehicle 420 has disappeared, the controller 425 may deactivate the third communication module 421 and the fourth communication module 423 of the vehicle 420, and may initialize the list of the candidate terminals and the list of the terminals of interest in the memory 427.

Figure 6:
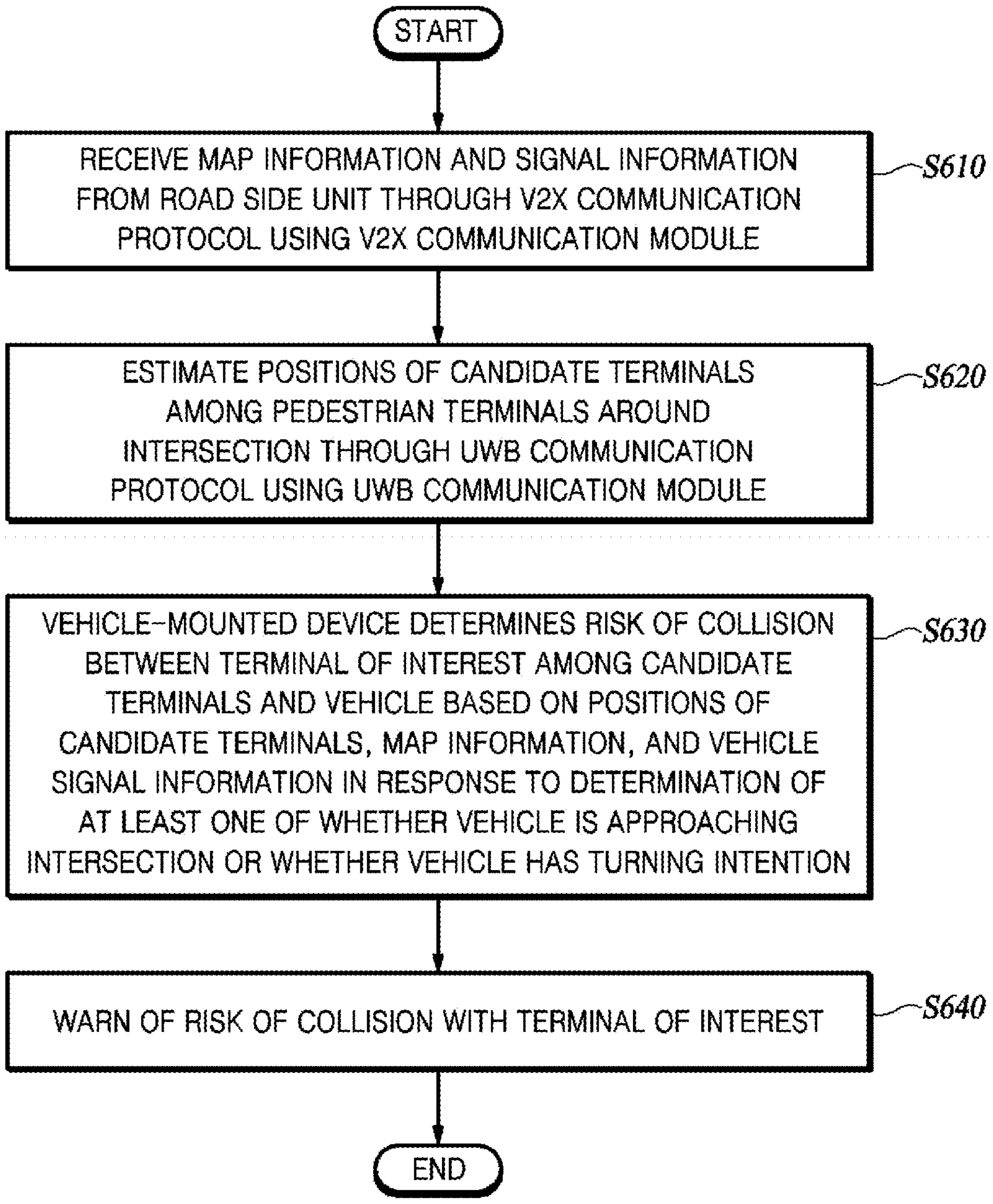
FIG. 6 is a flowchart of a right-turn assisting method according to an embodiment of the present disclosure.

FIG. 6 is a flowchart of a right-turn assisting method according to an embodiment of the present disclosure.

In FIG. 6, the V2X communication module may be referred to as a first communication module, the UWB communication module may be referred to as a second communication module, and the BLE communication module may be referred to as a third communication module.

Referring to FIG. 6, the right-turn assisting apparatus receives map information and signal information from the road side unit through the V2X communication protocol using the V2X communication module (S610).

Here, the map information includes a HD map, and the signal information includes intersection signal information and crosswalk signal information.

The right-turn assisting apparatus estimates positions of candidate terminals among terminals of pedestrians around the intersection through the UWB communication protocol using the UWB communication module (S620).

First, the right-turn assisting apparatus determines whether the vehicle is approaching the intersection, based on the map information received from the road side unit. Specifically, the right-turn assisting apparatus obtains the stop line position of the intersection from the map information, and the right-turn assisting apparatus determines the approach distance from the vehicle to the stop line position. The right-turn assisting apparatus determines that the vehicle has approached the intersection when the approach distance is shorter than the preset first threshold distance.

In response to the determination that the vehicle is approaching to the intersection, the right-turn assisting apparatus may activate the BLE communication module.

Subsequently, the right-turn assisting apparatus determines whether the vehicle has a turning intention, based on at least one of the vehicle's turn signal, navigation path, lane information, or signal information. For example, when the current lane of the vehicle is the right turn lane, the right-turn assisting apparatus may determine that the vehicle has an intention to turn right. The right-turn assisting apparatus may determine that the vehicle has an intention to turn right, when the current intersection signal according to the driving direction of the vehicle indicates the right turn signal.

The right-turn assisting apparatus may activate the UWB communication module in response to determining that the vehicle has the turning intention.

The right-turn assisting apparatus attempts to connect with terminals of pedestrians around the intersection using the BLE communication protocol, and designates the terminals connected in communication as candidate terminals. Then, the right-turn assisting apparatus estimates the respective positions and directions of the candidate terminals using the UWB communication protocol. In this regard, the BLE communication protocol has lower power and a wider communication range than the UWB communication protocol, whereas the UWB communication protocol has higher positioning accuracy than the BLE communication protocol.

The right-turn assisting apparatus estimates the positions of the candidate terminals using the UWB communication module. The right-turn assisting apparatus may estimate the positions of the candidate terminals based on priority according to the BLE received signal intensity.

Subsequently, the right-turn assisting apparatus determines the risk of collision between the terminal of interest among candidate terminals and the vehicle based on the map information and the signal information, in response to the determination of at least one of whether the vehicle is approaching the intersection or whether the vehicle has a turning intention (S630).

First, the right-turn assisting apparatus selects the terminal of interest from the candidate terminals. Specifically, the right-turn assisting apparatus classifies the movement types of the candidate terminals according to the position and direction relative to the vehicle, and selects the candidate terminal having a preset target movement type among the candidate terminals as the terminal of interest.

The right-turn assisting apparatus identifies the crosswalk areas of the intersection from the map information, and determines that at least one of the crosswalk areas is the expected movement area based on the position and direction of the terminal of interest.

The right-turn assisting apparatus determines that the expected movement area is a dangerous area based on the crosswalk signal for the expected movement area. Specifically, when the crosswalk signal for the expected movement area is a pedestrian signal, the right-turn assisting apparatus determines that the expected movement area is a dangerous area.

The right-turn assisting apparatus determines the risk of collision between the vehicle and the terminal of interest within the dangerous area. Specifically, the right-turn assisting apparatus may determine the risk of collision based on whether the terminal of interest has moved to the dangerous area, and based on the speed of the vehicle. Alternatively, the right-turn assisting apparatus may determine the risk of collision based on whether the direction of the terminal of interest intersects the navigation path of the vehicle within the dangerous area, and the speed of the vehicle.

When it is determined that there is a risk of collision, the right-turn assisting apparatus warns of the risk of collision with the terminal of interest (S640).

According to an embodiment, an apparatus and method for assisting a right turn of a vehicle can prevent a pedestrian collision based on a high definition map and signal information received through a V2X module in a system including the V2X module and a UWB module when the vehicle turns right at an intersection, and effectively prevent the collision with a pedestrian by detecting the pedestrian who is not detected by a sensor, and estimating the position of a pedestrian through UWB communication with a pedestrian's terminal.

According to an embodiment, an apparatus and method for assisting a right turn of a vehicle use a bluetooth module operating at low energy and a UWB module enabling high-precision positioning together, thus allowing high-accuracy positioning to be performed at low energy.

At least some of the components described in the exemplary embodiments of the present disclosure may be implemented as hardware elements including at least one of a Digital Signal Processor (DSP), a processor, a controller, an Application-Specific IC (ASIC), a programmable logic devices (FPGA, etc.), other electronic components, or a combination thereof. Moreover, at least some of the functions or processes described in the exemplary embodiments may be implemented as software, and the software may be stored in a recording medium. At least some of the components, functions, and processes described in the exemplary embodiments of the present disclosure may be implemented as a combination of hardware and software.

The method according to the exemplary embodiments of the present disclosure may be written as a program that can be executed on a computer and may also be implemented as various recording media such as magnetic storage media, optical reading media, digital storage media, etc.

Various techniques described herein may be implemented in digital electronic circuitry, or in computer hardware, firmware, software, or combinations thereof. Implementations may be in the form of a computer program tangibly embodied in a computer program product, i.e., an information carrier, e.g., a machine-readable storage device (computer-readable medium) or a propagated signal, for processing by, or controlling, the operation of, a data processing device, e.g., a programmable processor, a computer, or a number of computers. A computer program, such as the above-mentioned computer program(s), may be written in any form of programming language, including compiled or interpreted languages and may be deployed in any form, including as a stand-alone program or as a module, component, subroutine, or other unit suitable for use in a computing environment. The computer program may be deployed to run on a single computer or multiple computers at one site or distributed across multiple sites and interconnected by a communications network.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

Processors suitable for processing computer programs include, by way of example, both general purpose and special purpose microprocessors, as well as one or more processors of any kind of digital computer. Generally, a processor will receive instructions and data from a read-only memory or a random access memory or both. The essential elements of a computer may include at least one processor that executes instructions and one or more memory devices that store instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include, by way of example, semiconductor memory devices, e.g., Magnetic Media such as hard disks, floppy disks, and magnetic tapes, Optical Media such as Compact Disk Read Only Memories (CD-ROMs) and Digital Video Disks (DVDs), Magneto-Optical Medial such as Floptical Disks, Rea Only Memories (ROMs), Random Access Memories (RAMs), flash memories, Erasable Programmable ROMs (EPROMs), Electrically Erasable Programmable ROMs (EEPROM), etc. The processor and the memory may be supplemented by, or incorporated in, special purpose logic circuitry.

The processor may execute an Operating System and software applications executed on the Operating System. Moreover, a processor device may access, store, manipulate, process, and generate data in response to software execution. For the sake of convenience, there is a case where a single processor device is used, but those skilled in the art will understand that the processor device can include multiple processing elements and/or multiple types of processing elements. For example, the processor device may include a plurality of processors or a single processor and a single controller. Other processing configurations, such as such as parallel processors, are also possible.

In addition, non-transitory computer-readable media may be any available media that can be accessed by a computer, and may include both computer storage media and transmission media.

This specification includes details of various specific implementations, but they should not be understood as limiting the scope of any invention or what is claimed, and should be understood as descriptions of features that may be unique to particular embodiments of a particular invention. In the context of individual embodiments, specific features described herein may also be implemented in combination with a single embodiment. On the contrary, various features described in the context of a single embodiment can also be implemented in multiple embodiments independently or in any appropriate sub-combination. Further, although the features may operate in a particular combination and may be initially described as so claimed, one or more features from the claimed combination may be in some cases excluded from the combination, and the claimed combination may be modified into a sub-combination or a variation of the sub-combination.

Likewise, although the operations are depicted in the drawings in a particular order, it should not be understood that such operations must be performed in that particular order or sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. A right-turn assisting apparatus of a vehicle for preventing a collision with a pedestrian at an intersection, the apparatus comprising:

a communication unit including a first communication module configured to receive map information and signal information from a road side unit through a first communication protocol, and a second communication module configured to estimate positions of candidate terminals among terminals of pedestrians around the intersection through a second communication protocol; and a controller configured to determine a risk of collision between a terminal of interest among the candidate terminals and the vehicle based on the positions of the candidate terminals, the map information, and the signal information in response to determination of at least one of whether the vehicle is approaching the intersection or whether the vehicle has a turning intention, and to warn of the risk of collision with the terminal of interest.

2. The apparatus of claim 1, wherein the communication unit further comprises a third communication module having a lower power and a wider communication range than the second communication module, and wherein the controller is further configured to designate, as the candidate terminals, terminals connected to the third communication module among the terminals of the pedestrians around the intersection.

3. The apparatus of claim 2, wherein the second communication module is further configured to estimate the positions of the candidate terminals based on priority according to a received signal intensity of the third communication module.

4. The apparatus of claim 2, wherein the third communication module is activated in response to determining that the vehicle is approaching the intersection, and wherein the second communication module is activated in response to determining that the vehicle has the turning intention.

5. The apparatus of claim 1, wherein the controller is further configured to:

obtain a stop line position of the intersection from the map information;

determine an approach distance from the vehicle to the stop line position; and determine that the vehicle is approaching the intersection when the approach distance is less than a preset first threshold distance.

6. The apparatus of claim 1, wherein the controller is further configured to determine that the vehicle has the turning intention based on at least one of a turn signal of the vehicle, a navigation path, lane information, or the signal information.

7. The apparatus of claim 1, wherein the controller is further configured to:

classify movement types of the candidate terminals according to respective positions and directions relative to the vehicle; and select a candidate terminal having a target movement type among the candidate terminals as the terminal of interest.

8. The apparatus of claim 1, wherein the controller is further configured to:

identify crosswalk areas of the intersection from the map information;

determine, as an expected movement area, at least one of the crosswalk areas based on a position and a direction of the terminal of interest;

determine that the expected movement area is a dangerous area based on a crosswalk signal for the expected movement area; and determine the risk of collision between the vehicle and the terminal of interest in the dangerous area.

9. The apparatus of claim 8, wherein the controller is further configured to determine that the expected movement area is the dangerous area when the crosswalk signal for the expected movement area is a pedestrian signal.

10. The apparatus of claim 8, wherein the controller is further configured to determine the risk of collision based on whether the terminal of interest has entered the dangerous area and a speed of the vehicle.

11. The apparatus of claim 8, wherein the controller is further configured to determine the risk of collision based on whether a direction of the terminal of interest intersects a predicted path of the vehicle within the dangerous area and a speed of the vehicle.

12. A method of controlling a right-turn assisting apparatus of a vehicle for preventing a collision with a pedestrian at an intersection, the method comprising:

receiving map information and signal information from a road side unit through a first communication protocol using a first communication module;

estimating positions of candidate terminals among terminals of pedestrians around the intersection through a second communication protocol using a second communication module;

determining a risk of collision between a terminal of interest among the candidate terminals and the vehicle based on the positions of the candidate terminals, the map information, and the signal information in response to determination of at least one of whether the vehicle is approaching an intersection or whether the vehicle has a turning intention; and warning of the risk of collision with the terminal of interest.

13. The method of claim 12, further comprising:

designating, as the candidate terminals, terminals connected to the third communication module having a lower power and a wider communication range than the second communication module, among the terminals of the pedestrians around the intersection.

14. The method of claim 13, wherein the estimating positions of candidate terminals comprises:

estimating the positions of the candidate terminals based on priority according to a received signal intensity of the third communication module.

15. The method of claim 13, further comprising:

activating the third communication module in response to determining that the vehicle is approaching the intersection; and activating the second communication module in response to determining that the vehicle has the turning intention.

16. The method of claim 12, further comprising:

obtaining a stop line position of the intersection from the map information;

determining an approach distance from the vehicle to the stop line position; and determining that the vehicle is approaching the intersection when the approach distance is less than a preset first threshold distance.

17. The method of claim 12, further comprising:

determining the turning intention of the vehicle based on at least one of a turn signal of the vehicle, a navigation path, lane information, or the signal information.

18. The method of claim 12, further comprising:

classifying movement types of the candidate terminals according to respective positions and directions relative to the vehicle; and selecting a candidate terminal having a target movement type among the candidate terminals as the terminal of interest.

19. The method of claim 12, wherein the determining a risk of collision comprises:

identifying crosswalk areas of the intersection from the map information;

determining, as an expected movement area, at least one of the crosswalk areas based on a position and a direction of the terminal of interest;

determining that the expected movement area is a dangerous area based on a crosswalk signal for the expected movement area; and determining the risk of collision between the vehicle and the terminal of interest in the dangerous area.

20. The method of claim 19, wherein the determining that the expected movement area is a dangerous area comprises:

determining that the expected movement area is the dangerous area when the crosswalk signal for the expected movement area is a pedestrian signal.

21. The method of claim 19, wherein the determining the risk of collision comprises:

determining the risk of collision based on whether the terminal of interest has entered the dangerous area and a speed of the vehicle.

22. The method of claim 19, wherein the determining the risk of collision comprises:

determining the risk of collision based on whether a direction of the terminal of interest intersects a predicted path of the vehicle within the dangerous area and a speed of the vehicle.

* * * * *